U S 0 0 6 6 8 2 4 5 5 B 2

United States Patent
Bucknor et al.

(10) Patent No.: US 6,682,455 B2
(45) Date of Patent: Jan. 27, 2004

(54) FAMILY OF SIX-SPEED PLANETARY TRANSMISSIONS HAVING THREE PLANETARY GEARSETS AND FIVE TORQUE-TRANSMITTING MECHANISMS

(75) Inventors: Norman Kenneth Bucknor, Troy, MI (US); Madhusudan Raghavan, West Bloomfield, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 4 days.

(21) Appl. No.: 10/133,614

(22) Filed: Apr. 26, 2002

(65) Prior Publication Data
US 2003/0203786 A1 Oct. 30, 2003

(51) Int. Cl.[7] .............................. F16H 3/66
(52) U.S. Cl. ...................... 475/275
(58) Field of Search ............... 475/275, 280, 475/282, 284, 286

(56) References Cited

U.S. PATENT DOCUMENTS

| | | | |
|---|---|---|---|
| 4,070,927 A | 1/1978 | Polak | 74/765 |
| 5,057,063 A | * 10/1991 | Asada et al. | 475/278 |
| 5,106,352 A | 4/1992 | Lepelletier | 475/280 |
| 5,542,889 A | 8/1996 | Pierce et al. | 475/275 |
| 5,599,251 A | 2/1997 | Beim et al. | 475/275 |
| 6,071,208 A | 6/2000 | Koivunen | 475/275 |
| 6,083,135 A | 7/2000 | Baldwin et al. | 475/276 |

FOREIGN PATENT DOCUMENTS

| | | | |
|---|---|---|---|
| EP | 1033510 A1 | | 9/2000 |
| JP | 9-126283 A | * | 5/1997 |
| JP | 10-299844 A | * | 11/1998 |

* cited by examiner

*Primary Examiner*—Ankur Parekh
(74) *Attorney, Agent, or Firm*—Kathryn A. Marra (57) ABSTRACT

A family of six-speed planetary transmissions incorporates three planetary gearsets and five torque-transmitting mechanisms to produce at least six forward speed ratios and one reverse speed ratio. The planetary gearsets are interconnected with three interconnecting members. The first of the interconnecting members continuously interconnects a first member of each of the first and second planetary gearsets, a second of the interconnecting members continuously interconnects a second member of each of the first and second planetary gearsets, and a third of the interconnecting members continuously interconnects a member of the second planetary gearset with a member of the third planetary gearset. The output shaft is continuously interconnected with at least one member of the planetary gearsets. The transmission input shaft is selectively connectible with members of the planetary gearsets through at least two of the five torque-transmitting mechanisms. The five torque-transmitting mechanisms include three rotating type torque-transmitting mechanisms and two stationary type torque-transmitting mechanisms that are engaged in combinations of three to establish the speed ratios within the transmission.

2 Claims, 4 Drawing Sheets

FIG. 1

| | RATIOS | 56 | 58 | 50 | 52 | 54 |
|---|---|---|---|---|---|---|
| REVERSE | -2.02 | X | | X | | X |
| NEUTRAL | 0 | | | X | | X |
| 1 | 2.38 | | X | X | | X |
| 2 | 1.46 | | X | | X | X |
| 3 | 1.00 | | | X | X | X |
| 4 | 0.71 | | X | X | X | |
| 5 | 0.49 | X | | X | X | |
| 6 | 0.40 | X | X | | X | |

(X=engaged)

Ring Gear/Sun Gear Tooth Ratios: $\frac{R1}{S1}=1.57, \frac{R2}{S2}=2.10, \frac{R3}{S3}=1.53$

| Ratio Spread | 6.03 |
|---|---|
| Ratio Steps | |
| REV/1 | -0.85 |
| 1/2 | 1.64 |
| 2/3 | 1.46 |
| 3/4 | 1.40 |
| 4/5 | 1.45 |
| 5/6 | 1.24 |

| | RATIOS | 156 | 158 | 150 | 152 | 154 |
|---|---|---|---|---|---|---|
| REVERSE | -2.15 | | X | X | | X |
| NEUTRAL | 0 | | | X | | X |
| 1 | 2.54 | X | | X | | X |
| 2 | 1.49 | X | | | X | X |
| 3 | 1.00 | | | X | X | X |
| 4 | 0.69 | X | | X | X | |
| 5 | 0.48 | | X | X | X | |
| 6 | 0.40 | X | X | | X | |

(X=engaged)

Ring Gear/Sun Gear Tooth Ratios: $\frac{R1}{S1}=2.44, \frac{R2}{S2}=2.30, \frac{R3}{S3}=1.53$

| Ratio Spread | 6.43 |
|---|---|
| Ratio Steps | |
| REV/1 | -0.85 |
| 1/2 | 1.71 |
| 2/3 | 1.49 |
| 3/4 | 1.44 |
| 4/5 | 1.43 |
| 5/6 | 1.22 |

| | RATIOS | 256 | 258 | 250 | 252 | 254 |
|---|---|---|---|---|---|---|
| REVERSE | -2.02 | X | | X | | X |
| NEUTRAL | 0 | | | X | | X |
| 1 | 2.38 | | X | X | | X |
| 2 | 1.46 | | X | | X | X |
| 3 | 1.00 | | | X | X | X |
| 4 | 0.71 | | X | X | X | |
| 5 | 0.49 | X | | X | X | |
| 6 | 0.40 | X | X | | X | |

(X=engaged)

Ring Gear/Sun Gear Tooth Ratios: $\frac{R1}{S1}=2.57, \frac{R2}{S2}=2.10, \frac{R3}{S3}=1.53$

| Ratio Spread | 6.03 |
|---|---|
| Ratio Steps | |
| REV/1 | -0.85 |
| 1/2 | 1.64 |
| 2/3 | 1.46 |
| 3/4 | 1.40 |
| 4/5 | 1.45 |
| 5/6 | 1.24 |

| | RATIOS | 356 | 358 | 350 | 352 | 354 |
|---|---|---|---|---|---|---|
| REVERSE | -2.02 | X | | X | | X |
| NEUTRAL | 0 | | | X | | X |
| 1 | 2.38 | | X | X | | X |
| 2 | 1.46 | | X | | X | X |
| 3 | 1.00 | | | X | X | X |
| 4 | 0.71 | | X | X | X | |
| 5 | 0.49 | X | | X | X | |
| 6 | 0.40 | X | X | | X | |

(X=engaged)

Ring Gear/Sun Gear Tooth Ratios: $\frac{R1}{S1}=1.57, \frac{R2}{S2}=3.10, \frac{R3}{S3}=1.53$

| Ratio Spread | 6.03 |
|---|---|
| Ratio Steps | |
| REV/1 | -0.85 |
| 1/2 | 1.64 |
| 2/3 | 1.46 |
| 3/4 | 1.40 |
| 4/5 | 1.45 |
| 5/6 | 1.24 |

FIG. 8

FAMILY OF SIX-SPEED PLANETARY TRANSMISSIONS HAVING THREE PLANETARY GEARSETS AND FIVE TORQUE-TRANSMITTING MECHANISMS

TECHNICAL FIELD

This invention relates to six-speed planetary transmissions having three planetary gearsets and five selectively engageable torque-transmitting mechanisms.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 5,106,352 issued to Lepelletier on Apr. 21, 1992; U.S. Pat. No. 5,542,889 issued to Pierce et al. on Aug. 6, 1996; U.S. Pat. No. 5,599,251 issued to Beim and McCarrick on Feb. 4, 1997; U.S. Pat. No. 6,071,208 issued to Koivunen on Jun. 6, 2000; U.S. Pat. No. 6,083,135 issued to Baldwin et al. on Jul. 4, 2000; and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide a family of low content six-speed planetary transmission mechanisms having three planetary gearsets.

In one aspect of the present invention, each of the planetary gearsets has three members comprising a sun gear member, a ring gear member, or a planet carrier assembly member.

In another aspect of the present invention, the planet carrier assembly member can be either a single pinion or double pinion type planet carrier assembly member.

In yet another aspect of the present invention, each family member includes five torque-transmitting mechanisms comprised of three rotating type torque-transmitting mechanisms (clutches) and two stationary type torque-transmitting mechanisms (brakes).

In still another aspect of the present invention, a first member of a first of the planetary gearsets is continuously interconnected with a first member of the second of the planetary gearsets through an interconnecting member.

In yet still another aspect of the present invention, a second member of the first planetary gearset is continuously interconnected with a second member of the second planetary gearset through a second interconnecting member.

In yet still another aspect of the present invention, a first member of the third planetary gearset is continuously interconnected with either a first member or a third member of the second planetary gearset.

In a further aspect of the present invention, the transmission input shaft is selectively connectible with one or more of the planetary gearsets through two of the rotating type selectively engageable torque-transmitting mechanisms.

In a yet further aspect of the present invention, a transmission output shaft is continuously connected with at least one member of one of the planetary gearsets.

In a still further aspect of the present invention, a first of the stationary torque-transmitting mechanisms is selectively connectible with a member of the first or second planetary gearset, and a stationary member of the transmission, such as a transmission housing, and a second of the stationary torque-transmitting mechanisms is selectively connectible between a member of the second or third planetary gearset and the stationary member of the transmission.

In yet still a further aspect of the present invention, a third of the rotating type torque-transmitting mechanisms is selectively interconnectible between a member of one of the planetary gearsets and the input shaft, the output shaft, or another member of one of the planetary gearsets.

In still a further aspect of the present invention, the selectively engageable torque-transmitting mechanisms are engaged in combinations of three to establish at least six forward speed ratios and one reverse speed ratio between the input shaft and the output shaft through the planetary gearsets.

DESCRIPTION OF THE EXEMPLARY EMBODIMENT

Figure 1:
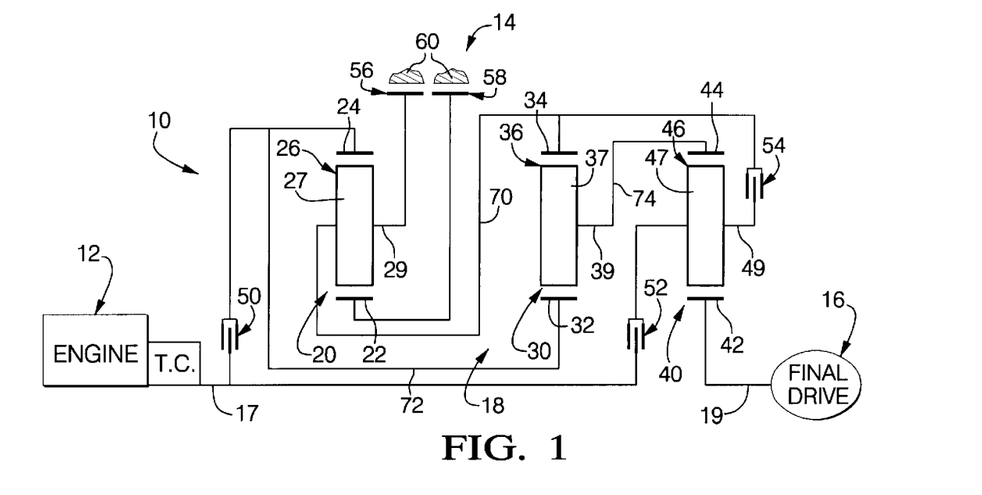
FIG. 1 is a schematic representation of a powertrain incorporating one family member of the present invention.

Referring to the drawings, wherein like characters represent the same or corresponding parts throughout the several views, there is seen in FIG. 1 a powertrain 10, having a conventional engine and torque converter 12, a planetary transmission 14, and a conventional final drive mechanism 16. The planetary transmission 14 includes an input shaft 17, a planetary gear arrangement 18, and an output shaft 19. The planetary gear arrangement 18 includes three planetary gearsets 20, 30, and 40, and five torque-transmitting mechanisms 50, 52, 54, 56, and 58. The torque-transmitting mechanisms 50, 52, and 54 are rotating type torque-transmitting mechanisms (clutches), and the torque-transmitting mechanisms 56 and 58 are stationary type torque-transmitting mechanisms (brakes).

The planetary gearset 20 includes a sun gear member 22, a ring gear member 24, and a planet carrier assembly member 26. The planet carrier assembly member 26 includes a plurality of pinion gears 27 rotatably mounted on a planet carrier 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 rotatably mounted on a planet carrier assembly member 39 and disposed in meshing relationship with both the sun gear member 32 and the ring gear member 34.

The planetary gearset 40 includes a sun gear member 42, a ring gear member 44, and planet carrier assembly member 46. The planet carrier assembly member 46 includes a plurality of pinion gears 47 rotatably mounted on a planet carrier 49 and disposed in meshing relationship with both the sun gear member 42 and the ring gear member 44.

Each of the schematic representations of the planetary gearsets 20, 30, and 40 show single pinion gears 27, 37, and 47, respectively. However, as is well known, each of the planet carriers 29, 39, and 49 will provide mountings for three or four equally spaced pinion gears, such that the torque loads may be equally divided around the periphery of the sun gear member and ring gear member.

The planet carrier assembly member 26 is continuously interconnected with the ring gear member 34 through an interconnecting member 70. The ring gear member 24 is continuously interconnected with the sun gear member 32 through an interconnecting member 72. The planet carrier assembly member 36 is continuously connected with the ring gear member 44 through an interconnecting member 74. The output shaft 19 is continuously connected with the sun gear member 42. The planet carrier assembly member 46 and the sun gear member 22 are not continuously interconnected with members of the other planetary gearsets.

The input shaft 17 is selectively connectible with the ring gear member 24 through the torque-transmitting mechanism 50, and selectively connectible with the planet carrier assembly member 46 through the torque-transmitting mechanism 52. The planet carrier assembly member 46 is selectively connectible with the interconnecting member 70 through the torque-transmitting mechanism 54. The interconnecting member 70 is selectively connectible with a transmission housing 60 through the torque-transmitting mechanism 56. The sun gear member 22 is selectively connectible with the transmission housing 60 through the torque-transmitting mechanism 58.

Figure 2:
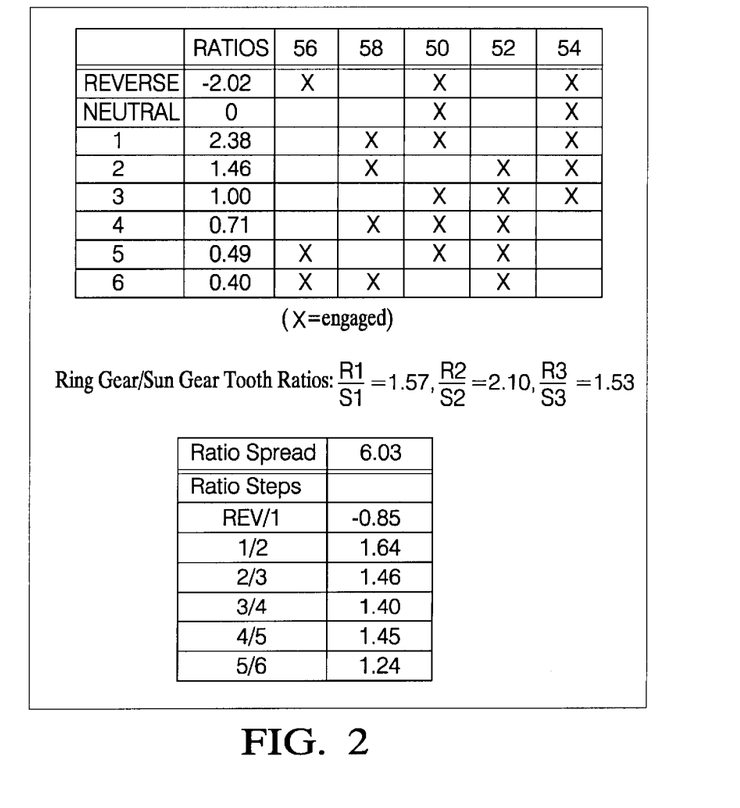
FIG. 2 is a truth table and chart depicting some of the operating characteristics of the family member shown in FIG. 1.

As seen in the truth table of FIG. 2, the torque-transmitting mechanisms 50, 52, 54, 56, and 58 are selectively engaged in combinations of three to establish six forward speed ratios and one reverse speed ratio between the input shaft 17 and the output shaft 19 through the planetary gear arrangement 18. The truth table also provides an example of numerical values for each of the speed ratios. These numerical values are determined utilizing the ring gear/sun gear tooth ratios of the planetary gearsets 20, 30, and 40, which are shown respectively as R1/S1, R2/S2, and R3/S3. Further information found in FIG. 2 is the ratio steps between adjacent forward speed ratios as well as the ratio step between reverse and the first forward speed ratio. Those skilled in the art will recognize from the truth table that each of the single step forward ratio interchanges are of the single transition variety, as are each of the double step forward interchanges.

The reverse speed ratio is established with the engagement of the torque-transmitting mechanisms 50, 54, and 56. This combination of engagements connects the planet carrier assembly member 46, the ring gear member 34, and the planet carrier assembly member 26 with the transmission housing 60 and connects the ring gear member 24 and sun gear member 32 with the input shaft 17. The planet carrier assembly member 36 and ring gear member 44 are rotated at a speed determined by the speed of the sun gear member 32 and the ring gear/sun gear tooth ratio of the planetary gearset 30. The sun gear member 42 and therefore output shaft 19 are rotated at a speed determined by the speed of the ring gear member 44 and the ring gear/sun gear tooth ratio of the planetary gearset 40. The numerical value of the reverse speed ratio is determined by the ring gear/sun gear tooth ratios of the planetary gearsets 30 and 40.

The first forward speed ratio is established with the engagement of the torque-transmitting mechanisms 50, 54, and 58. During the first forward speed ratio, the sun gear member 22 is held stationary, and the ring gear member 24 and sun gear member 32 are driven by the input shaft 17. The interconnecting member 70 and the planet carrier assembly member 46 rotate in unison. During the first forward speed ratio, the planet carrier assembly member 26, ring gear member 34, and planet carrier assembly member 46 are rotated at a speed determined by the speed of the ring gear member 24 and the ring gear/sun gear tooth ratio of the planetary gearset 20. The planet carrier assembly member 36 and ring gear member 44 are rotated at a speed determined by the speed of the sun gear member 32, the speed of the ring gear member 34, and the ring gear/sun gear tooth ratio of the planetary gearset 30. The sun gear member 42 and therefore output shaft 19 are rotated at a speed determined by the speed of the ring gear member 44, the speed of the planet carrier assembly member 46, and the ring gear/sun gear tooth ratio of the planetary gearset 40. The numerical value of the first forward speed ratio is determined by the ring gear/sun gear tooth ratios of all three planetary gearsets 20, 30, and 40.

The second forward speed ratio is established with the engagement of the torque-transmitting mechanisms 52, 54, and 58. This combination of engagements holds the sun gear member 22 stationary, and interconnects the planet carrier assembly member 46 and interconnecting member 70 with the input shaft 17. During the second forward speed ratio, the ring gear member 24 and sun gear member 32 are rotated at a speed determined by the speed of the planet carrier assembly member 26 and the ring gear/sun gear tooth ratio of the planetary gearset 20. The planet carrier assembly member 36 and ring gear member 44 are rotated at a speed determined by the speed of the sun gear member 32, the speed of the ring gear member 34, and the ring gear/sun gear tooth ratio of the planetary gearset 30. The sun gear member 42 and therefore output shaft 19 are rotated at a speed determined by the speed of the ring gear member 44, the speed of the planet carrier assembly member 46, and the ring gear/sun gear tooth ratio of the planetary gearset 40. The numerical value of the second forward speed ratio is determined by the ring gear/sun gear tooth ratios of all three planetary gearsets 20, 30, and 40.

The third forward speed ratio is established with the engagement of the torque-transmitting mechanisms 50, 52, and 54. This combination of engagements produces a direct drive between the input shaft 17 and the output shaft 19 by causing the planetary gearsets 30 and 40 to rotate in unison with the input shaft 17. The numerical value of the third forward speed ratio is one.

The fourth forward speed ratio is established with the engagement of the torque-transmitting mechanisms 50, 52, and 58. This combination of engagements holds the sun gear member 22 stationary, and connects the sun gear member 32 and ring gear member 24 with the input shaft 17, and also connects the planet carrier assembly member 46 with the input shaft 17. During the fourth forward speed ratio, the planet carrier assembly member 26 and ring gear member 34 are rotated at a speed determined by the speed of the ring gear member 24 and the ring gear/sun gear tooth ratio of the planetary gearset 20. The planet carrier assembly member 36 and ring gear member 44 are rotated at a speed determined by the speed of the sun gear member 32, the speed of the ring gear member 34, and the ring gear/sun gear tooth ratio of the planetary gearset 30. The sun gear member 42 and therefore output shaft 19 are rotated at a speed determined by the speed of the planet carrier assembly member 46, the speed of the ring gear member 44, and the ring gear/sun gear tooth ratio of the planetary gearset 40. The numerical value of the fourth forward speed ratio is determined by the ring gear/sun gear tooth ratios of all three planetary gearsets 20, 30, and 40.

The fifth forward speed ratio is established with the engagement of the torque-transmitting mechanisms 50, 52, and 56. This combination of engagements connects the interconnecting member 70 with the transmission housing 60, and connects the sun gear member 32, ring gear member 24, and planet carrier assembly member 46 with the input shaft 17. During the fifth forward speed ratio, the planet carrier assembly member 36 and ring gear member 44 are rotated at a speed determined by the speed of the sun gear member 32 and the ring gear/sun gear tooth ratio of the planetary gearset 30. The sun gear member 42 and therefore output shaft 19 are rotated at a speed determined by the speed of the planet carrier assembly member 46, the speed of the ring gear member 44, and the ring gear/sun gear tooth ratio of the planetary gearset 40. The numerical value of the fifth forward speed ratio is determined by the ring gear/sun gear tooth ratios of the planetary gearsets 30 and 40.

The sixth forward speed ratio is established with the engagement of the torque-transmitting mechanisms 52, 56, and 58. This combination of engagements holds the planetary gearset 30, the planetary gearset 40, and the ring gear member 44 stationary, and interconnects the input shaft 17 with the planet carrier assembly member 46. During the sixth forward speed ratio, the sun gear member 42 and therefore output shaft 19 are rotated at a speed determined by the speed of the planet carrier assembly member 46 and the ring gear/sun gear tooth ratio of the planetary gearset 40. The numerical value of the sixth forward speed ratio is determined by the ring gear/sun gear tooth ratio of the planetary gearset 40.

Figure 3:
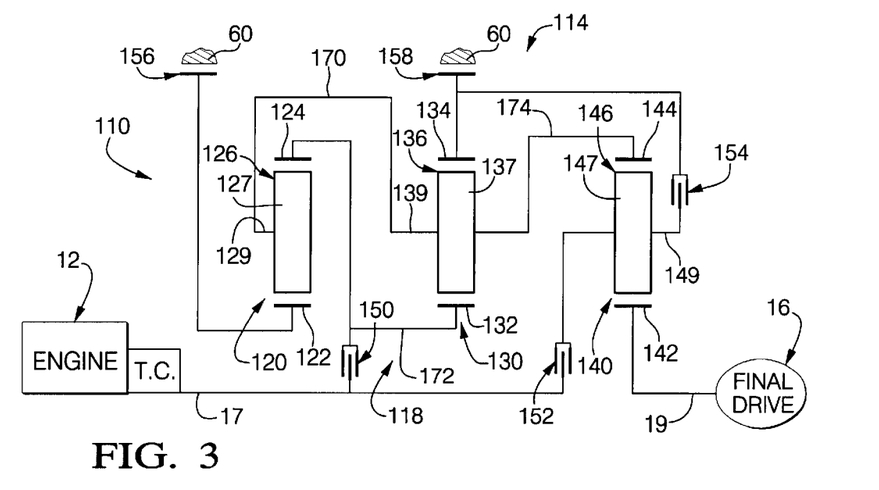
FIG. 3 is a schematic representation of a powertrain incorporating another of the family members of the present invention.

A powertrain 110, shown in FIG. 3, includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, three rotating type torque-transmitting mechanisms 150, 152, and 154, and two stationary type torque-transmitting mechanisms 156, and 158.

The planetary gearset 120 includes a sun gear member 122, a ring gear member 124, and a planet carrier assembly member 126. The planet carrier assembly member 126 includes a plurality of pinion gears 127 rotatably mounted on a planet carrier 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier assembly member 139 and disposed in meshing relationship with both the sun gear member 132 and the ring gear member 134.

The planetary gearset 140 includes a sun gear member 142, a ring gear member 144, and planet carrier assembly member 146. The planet carrier assembly member 146 includes a plurality of pinion gears 147 rotatably on a planet carrier 149 and disposed in meshing relationship with both the sun gear member 142 and the ring gear member 144.

The planet carrier assembly member 126 and planet carrier assembly member 136 are interconnected by an interconnecting member 170. The ring gear member 124 and sun gear member 132 are interconnected by an interconnecting member 172. The planet carrier assembly member 136 and ring gear member 144 are interconnected by an interconnecting member 174. The sun gear member 142 is continuously connected with the output shaft 19.

The input shaft 17 is selectively connectible with the interconnecting member 172 through the torque-transmitting mechanism 150, and with the planet carrier assembly member 146 through the torque-transmitting mechanism 152. The planet carrier assembly member 146 is selectively interconnectible with the ring gear member 134 through the torque-transmitting mechanism 154. The sun gear member 122 is selectively connectible with the transmission housing 60 through the torque-transmitting mechanism 156. The ring gear member 134 is selectively connectible with the transmission housing 60 through the torque-transmitting mechanism 158. The planetary gear arrangement 118 has three noncontinuously interconnected members, namely, sun gear member 122, ring gear member 134, and planet carrier assembly member 146. These three planetary members are only interconnected with other members of the planetary arrangement through the respective torque-transmitting mechanisms 156, 152, 154, and 158.

Figure 4:
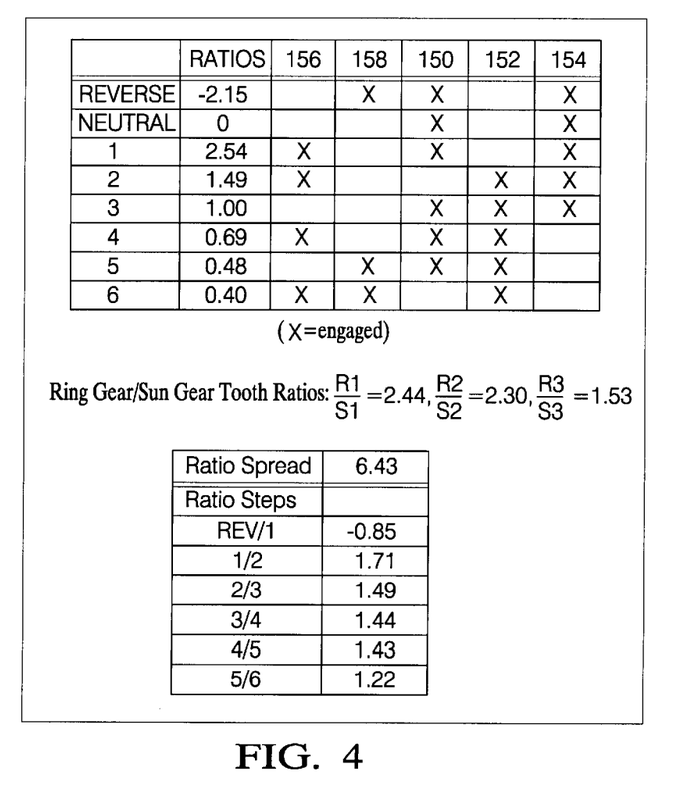
FIG. 4 is a truth table and chart depicting some of the operating characteristics of the family member shown in FIG. 3.

The truth table of FIG. 4 describes the combination of engagements for the torque-transmitting mechanisms, as well as the sequence of engagements, in order to provide six forward speed ratios and one reverse speed ratio through the planetary gear arrangement 118 between the input shaft 17 and the output shaft 19. The truth table also provides an example of numerical examples for each of the speed ratios. These numerical values are determined utilizing the ring gear/sun gear tooth ratios of the planetary gearsets 120, 130, and 140 that are shown as R1/S1, R2/S2, and R3/S3, respectively, in FIG. 4. FIG. 4 also has a chart of the ratio steps that are available between each of the adjacent forward speed ratios as well as between the reverse and first forward speed ratio. These numerical values are determined utilizing the numerical values of the speed ratios given in the truth table. Those skilled in the art will recognize from the truth table that each of the single step forward interchanges, as well as the double step forward interchanges, are of the single transition variety.

The reverse speed ratio is established with the engagement of the torque-transmitting mechanisms 150, 154, and 158. This combination of engagements connects the ring gear member 134 and planet carrier assembly member 146 with the transmission housing 60. The sun gear member 132 and ring gear member 124 are connected with the input shaft 17 through the interconnecting member 172. During the reverse speed ratio, the planet carrier assembly member 136 and ring gear member 144 are rotated at a speed determined by the speed of the sun gear member 132 and the ring gear/sun gear tooth ratio of the planetary gearset 130. The sun gear member 142 and therefore output shaft 19 are rotated at a speed determined by the speed of the ring gear member 144 and the ring gear/sun gear tooth ratio of the planetary gearset 140. The numerical value of the reverse speed ratio is determined by the ring gear/sun gear tooth ratios of the planetary gearsets 130 and 140.

The first forward speed ratio is established with the engagement of the torque-transmitting mechanisms 150, 154, and 156. This combination of engagements connects the sun gear member 122 with the transmission housing 60, interconnects the input shaft 17 with the interconnecting member 172, and interconnects the ring gear member 134 and planet carrier assembly member 146 for common rotation. During the first forward speed ratio, the planet carrier assembly member 126, planet carrier assembly member 136, and the ring gear member 144 are rotated at a speed determined by the speed of the ring gear member 124 and the ring gear/sun gear tooth ratio of the planetary gearset 120. The ring gear member 134 and planet carrier assembly member 146 are rotated at a speed determined by the speed of the sun gear member 132, the speed of the planet carrier assembly member 136, and the ring gear/sun gear tooth ratio of the planetary gearset 130. The sun gear member 142 and therefore output shaft 19 are rotated at a speed determined by the speed of the ring gear member 144, the speed of the planet carrier assembly member 146, and the ring gear/sun gear tooth ratio of the planetary gearset 140. The numerical of the first forward speed ratio is determined by the ring gear/sun gear tooth ratios of all three planetary gearsets 120, 130, and 140.

The second forward speed ratio is established with the engagement of the torque-transmitting mechanisms 152, 154, and 156. This combination of engagements connects the sun gear member 122 with the transmission housing 60, and interconnects the input shaft 17 with the planet carrier assembly member 146 and the ring gear member 134. During the second forward speed ratio, the planet carrier assembly member 126, planet carrier assembly member 136, and ring gear member 144 are rotated at a speed determined by the speed of the ring gear member 124 and the ring gear/sun gear tooth ratio of the planetary gearset 120. The sun gear member 132 and ring gear member 124 are rotated at a speed determined by the speed of the ring gear member 134, the speed of the planet carrier assembly member 136, and the ring gear/sun gear tooth ratio of the planetary gearset 130. The sun gear member 142 and therefore output shaft 19 are rotated at a speed determined by the speed of the planet carrier assembly member 146, the speed of the ring gear member 144, and the ring gear/sun gear tooth ratio of the planetary gearset 140. The numerical value of the second forward speed ratio is determined by the ring gear/sun gear tooth ratios of all three planetary gearsets 120, 130, and 140.

The third forward speed ratio is established with the engagement of the torque-transmitting mechanisms 150, 152, and 154. This combination of engagements causes the planetary gearsets 130 and 140 to rotate in unison with both the input shaft 17 and the output shaft 19, thereby creating a direct drive having a numerical value of one.

The fourth forward speed ratio is established with the engagement of the torque-transmitting mechanisms 150, 152, and 156. This combination of engagements connects the sun gear member 122 with the transmission housing 60, and interconnects the input shaft 17 with the interconnecting member 172 and the planet carrier assembly member 146. During the fourth forward speed ratio, the planet carrier assembly member 126, planet carrier assembly member 136, and ring gear member 144 are rotated at a speed determined by the speed of the ring gear member 124 and the ring gear/sun gear tooth ratio of the planetary gearset 120. The sun gear member 142 and therefore output shaft 19 are rotated at a speed determined by the speed of the planet carrier assembly member 146, the speed of the ring gear member 144, and the ring gear/sun gear tooth ratio of the planetary gearset 140. The numerical value of the fourth forward speed ratio is determined by the ring gear/sun gear tooth ratios of the planetary gearsets 120 and 140.

The fifth forward speed ratio is established with the engagement of the torque-transmitting mechanisms 150, 152, and 158. This combination of engagements connects the ring gear member 134 with the transmission housing 60, and interconnects the input shaft 17 with the sun gear member 132 and the planet carrier assembly member 146. During the fifth forward speed ratio, the planet carrier assembly member 136 and ring gear member 144 are rotated at a speed determined by the speed of the sun gear member 132 and the ring gear/sun gear tooth ratio of the planetary gearset 130. The sun gear member 142 and therefore output shaft 19 are rotated at a speed determined by the speed of the planet carrier assembly member 146, the speed of the ring gear member 144, and the ring gear/sun gear tooth ratio of the planetary gearset 140. The numerical value of the fifth forward speed ratio is determined by the ring gear/sun gear tooth ratios of the planetary gearsets 130 and 140.

The sixth forward speed ratio is established with the engagement of the torque-transmitting mechanisms 152, 156, and 158. This combination of engagement connects the sun gear member 122 with the transmission housing 60, connects the ring gear member 134 with the transmission housing 60, and interconnects the input shaft 17 with the planet carrier assembly member 146. During the sixth forward speed ratio, the interconnecting member 172 is rotated at a speed determined by the speed of the interconnecting member 170 and the ring gear/sun gear tooth ratio of the planetary gearset 120. The interconnecting member 170 and interconnecting member 174 are rotated at a speed determined by the speed of the sun gear member 132 and the ring gear/sun gear tooth ratio of the planetary gearset 130. The sun gear member 142 and therefore output shaft 19 are rotated at a speed determined by the speed of the planet carrier assembly member 146, the speed of the ring gear member 144, and the ring gear/sun gear tooth ratio of the planetary gearset 140. The numerical value of the sixth forward speed ratio is determined by the ring gear/sun gear tooth ratios of all three planetary gearsets 120, 130, and 140.

Figure 5:
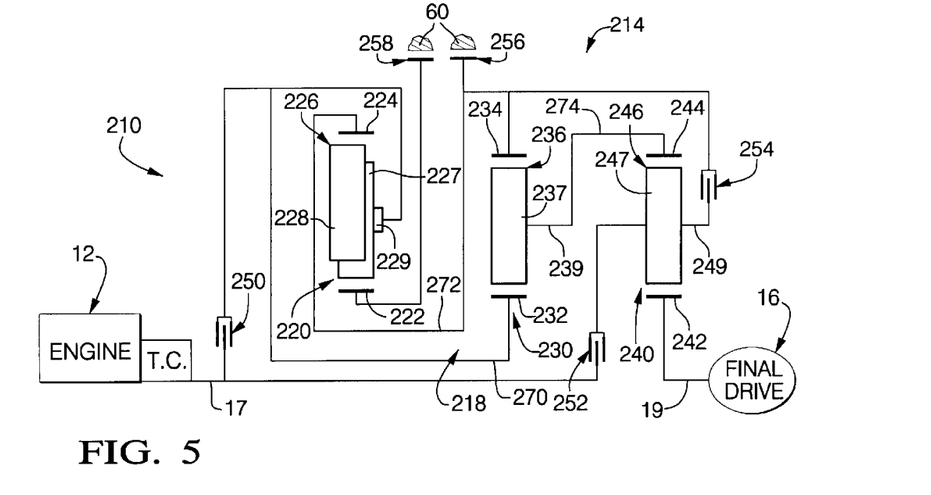
FIG. 5 is a schematic representation of a powertrain incorporating another of the family members of the present invention.

A powertrain 210, shown in FIG. 5, includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, three rotating type torque-transmitting mechanisms 250, 252, and 254, and two stationary type torque-transmitting mechanisms 256, and 258.

The planetary gearset 220 includes a sun gear member 222, a ring gear member 224, and a planet carrier assembly member 226. The planet carrier assembly member 226 includes a plurality of pairs of intermeshing pinion gears 227 and 228 that are rotatably mounted on a planet carrier 229 and disposed in meshing relationship with the sun gear member 222 and the ring gear member 224, respectively.

The planetary gearset 230 includes a sun gear member 232, a ring gear member 234, and a planet carrier assembly member 236. The planet carrier assembly member 236 includes a plurality of pinion gears 237 rotatably mounted on a planet carrier assembly member 239 and disposed in meshing relationship with both the sun gear member 232 and the ring gear member 234.

The planetary gearset 240 includes a sun gear member 242, a ring gear member 244, and planet carrier assembly member 246. The planet carrier assembly member 246 includes a plurality of pinion gears 247 rotatably on a planet carrier 249 and disposed in meshing relationship with both the sun gear member 242 and the ring gear member 244.

The planet carrier assembly member 226 and sun gear member 232 are continuously interconnected by an interconnecting member 270. The ring gear member 224 and ring gear member 234 are continuously interconnected by an interconnecting member 272. The planet carrier assembly member 236 and ring gear member 244 are continuously interconnected by an interconnecting member 274. The sun gear member 242 is continuously connected with the output shaft 19.

The input shaft 17 is selectively connectible with the interconnecting member 270 through the torque-transmitting mechanism 250, and selectively connectible with the planet carrier assembly member 246 through the torque-transmitting mechanism 252. The planet carrier assembly member 246 is selectively connectible with the interconnecting member 272 through the torque-transmitting mechanism 254. The interconnecting member 272 is selectively connectible with the transmission housing 60 through the torque-transmitting mechanism 256. The sun gear member 222 is selectively connectible with the transmission housing 60 through the torque-transmitting mechanism 258. The sun gear member 222 and planet carrier assembly member 246 are noncontinuously interconnected members of the planetary gear arrangement 218.

Figure 6:
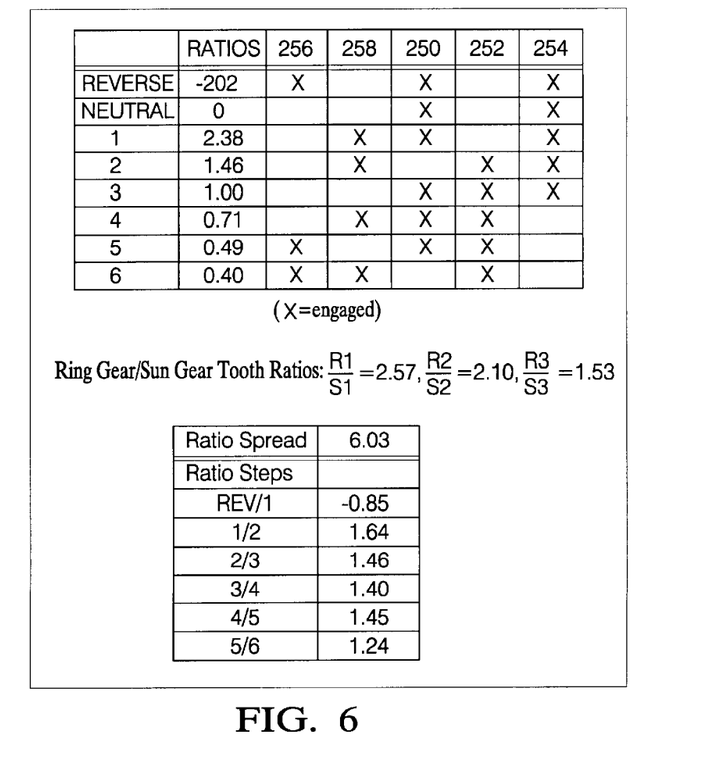
FIG. 6 is a truth table and chart depicting some of the operating characteristics of the family member shown in FIG. 5.

The truth table of FIG. 6 describes the combination of engagements for the torque-transmitting mechanisms, as well as the sequence of engagements, to produce six forward speed ratios and one reverse speed ratio through the planetary gear arrangement 218 between the input shaft 17 and the output shaft 19. The truth table also provides a numerical example of the speed ratios that are available with the planetary gear arrangement 218 when the ring gear/sun gear tooth ratios of the planetary gearsets 220, 230, and 240 are as given in FIG. 6 as R1/S1, R2/S2, and R3/S3, respectively. The chart in FIG. 6 provides a numerical example of the ratio steps between the adjacent forward speed ratios as well as between the reverse and first forward speed ratio when the numerical values given in the truth table are utilized. It will be recognized from the truth table that each of the single step forward interchanges, as well as the double step forward interchanges, are of the single transition variety.

The reverse speed ratio is established with the engagement of the torque-transmitting mechanisms 250, 254, and 256. This combination of engagements interconnects the ring gear members 224 and 234, and planet carrier assembly member 246 with the transmission housing 60. The planet carrier assembly member 226 and sun gear member 232 are interconnected with the input shaft 17. During the reverse speed ratio, the planet carrier assembly member 236 and ring gear member 244 are rotated at a speed determined by the speed of the sun gear member 232 and the ring gear/sun gear tooth ratio of the planetary gearset 230. The sun gear member 242 and therefore output shaft 19 are rotated at a speed determined by the speed of the ring gear member 244 and the ring gear/sun gear tooth ratio of the planetary gearset 240. The numerical value of the reverse speed ratio is determined by the ring gear/sun gear tooth ratios of the planetary gearsets 230 and 240.

The first forward speed ratio is established with the engagement of the torque-transmitting mechanisms 250, 254, and 258. This combination of engagements interconnects the sun gear member 222 with the transmission housing 60, interconnects the sun gear member 232 and planet carrier assembly member 226 with the input shaft 17, and interconnects the ring gear members 224 and 234 with the planet carrier assembly member 246. During the first forward speed ratio, the ring gear member 224 and planet carrier assembly member 246 are rotated at a speed determined by the speed of the planet carrier assembly member 226 and the ring gear/sun gear tooth ratio of the planetary gearset 220. The planet carrier assembly member 236 and ring gear member 244 are rotated at a speed determined by the speed of the sun gear member 232, the speed of the ring gear member 234, and the ring gear/sun gear tooth ratio of the planetary gearset 230. The sun gear member 242 and therefore output shaft 19 are rotated at a speed determined by the speed of the planet carrier assembly member 246, the speed of the ring gear member 244, and the ring gear/sun gear tooth ratio of the planetary gearset 240. The numerical value of the first forward speed ratio is determined by the ring gear/sun gear tooth ratios of all three planetary gearsets 220, 230, and 240.

The second forward speed ratio is established with the engagement of the torque-transmitting mechanisms 252, 254, and 258. This combination of engagements interconnects the sun gear member 222 with the transmission housing 60, and interconnects the input shaft 17 with the planet carrier assembly member 246 and the interconnecting member 272. During the second forward speed ratio, the planet carrier assembly member 226 and sun gear member 232 are rotated at a speed determined by the speed of the ring gear member 224 and the ring gear/sun gear tooth ratio of the planetary gearset 220. The planet carrier assembly member 236 and ring gear member 244 are rotated at a speed determined by the speed of the ring gear member 234, the speed of the sun gear member 232, and the ring gear/sun gear tooth ratio of the planetary gearset 230. The sun gear member 242 and therefore output shaft 19 are rotated at a speed determined by the speed of the planet carrier assembly member 246, the speed of the ring gear member 244, and the ring gear/sun gear tooth ratio of the planetary gearset 240. The numerical value of the second forward speed ratio is determined by the ring gear/sun gear tooth ratios of all three planetary gearsets 220, 230, and 240.

The third forward speed ratio is established with the engagement of the torque-transmitting mechanisms 250, 252, and 254. This combination of engagements causes the planetary gearsets 220, 230, and 240 to rotate in unison with the input shaft 17 and the output shaft 19 thereby providing a 1:1 or direct drive through the planetary gear arrangement 218. The third forward speed ratio has a numerical value of one.

The fourth forward speed ratio is established with the engagement of the torque-transmitting mechanisms 250, 252, and 258. This combination of engagements interconnects the sun gear member 222 with the transmission housing 60, and interconnects the input shaft 17 with the planet carrier assembly member 226, the sun gear member 232, and the planet carrier assembly member 246. During the fourth forward speed ratio, the ring gear members 224 and 234 are rotated at a speed determined by the speed of the planet carrier assembly member 226 and the ring gear/sun gear tooth ratio of the planetary-gearset 220. The planet carrier assembly member 236 and ring gear member 244 are rotated at a speed determined by the speed of the sun gear member 232, the speed of the ring gear member 234, and the ring gear/sun gear tooth ratio of the planetary gearset 230. The sun gear member 242 and therefore output shaft 19 are rotated at a speed determined by the speed of the planet carrier assembly member 246, the speed of the ring gear member 244, and the ring gear/sun gear tooth ratio of the planetary gearset 240. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250, 252, and 256. This combination of engagements interconnects the ring gear members 224 and 234 with the transmission housing 60, and interconnects the input shaft 17 with the sun gear member 232, the planet carrier assembly member 226, and the planet carrier assembly member 246. During the fifth forward speed ratio, the planet carrier assembly member 236 and ring gear member 244 are rotated at a speed determined by the speed of the sun gear member 232 and the ring gear/sun gear tooth ratio of the planetary gearset 230. The sun gear member 242 and therefore output shaft 19 are rotated at a speed determined by the speed of the planet carrier assembly member 246, the speed of the ring gear member 244, and the ring gear/sun gear tooth ratio of the planetary gearset 240. The numerical value of the fifth forward speed ratio is determined by the ring gear/sun gear tooth ratios of the planetary gearsets 230 and 240.

The sixth forward speed ratio is established with the engagement of the torque-transmitting mechanisms 252, 256, and 258. This combination of engagements effectively connects the ring gear member 244 with the transmission housing 60, and the input shaft 17 with the planet carrier assembly member 246. During the sixth forward speed ratio, the sun gear member 242 and therefore output shaft 19 are rotated at a speed determined by the speed of the planet carrier assembly member 246 and the ring gear/sun gear tooth ratio of the planetary gearset 240. The numerical value of the sixth forward speed ratio is determined by the ring gear/sun gear tooth ratio of the planetary gearset 240.

Figure 7:
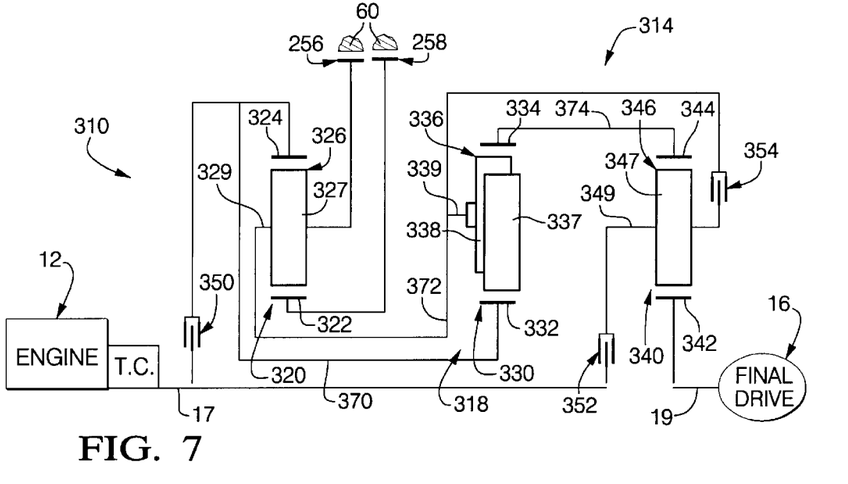
FIG. 7 is a schematic representation of a powertrain incorporating another of the family members of the present invention.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, three rotating type torque-transmitting mechanisms 350, 352, and 354, and two stationary type torque-transmitting mechanisms 356, and 358.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pairs of intermeshing pinion gears 337 and 338 that are rotatably mounted on a planet carrier assembly member 339 and disposed in meshing relationship with the sun gear member 332 and the ring gear member 334, respectively.

The planetary gearset 340 includes a sun gear member 342, a ring gear member 344, and planet carrier assembly member 346. The planet carrier assembly member 346 includes a plurality of pinion gears 347 rotatably on a planet carrier 349 and disposed in meshing relationship with both the sun gear member 342 and the ring gear member 344.

The ring gear member 324 is continuously interconnected with the sun gear member 332 through an interconnecting member 370. The planet carrier assembly member 326 is continuously interconnected with the planet carrier assembly member 336 through an interconnecting member 372. The ring gear members 334 and 344 are continuously interconnected through an interconnecting member 374. The sun gear member 342 is continuously connected with the output shaft 19.

The input shaft 17 is selectively interconnectible with the interconnecting member 370 through the torque-transmitting mechanism 350, and with the planet carrier assembly member 346 through the torque-transmitting mechanism 352. The planet carrier assembly member 346 is selectively interconnectible with the interconnecting member 372 through the torque-transmitting mechanism 354. The interconnecting member 372 is selectively connectible with the transmission housing 60 through the torque-transmitting mechanism 356. The sun gear member 322 is selectively interconnectible with transmission housing 60 through the torque-transmitting mechanism 358. The sun gear member 322 and planet carrier assembly member 346 are noncontinuously interconnected members of the planetary gear arrangement 318.

Figure 8:
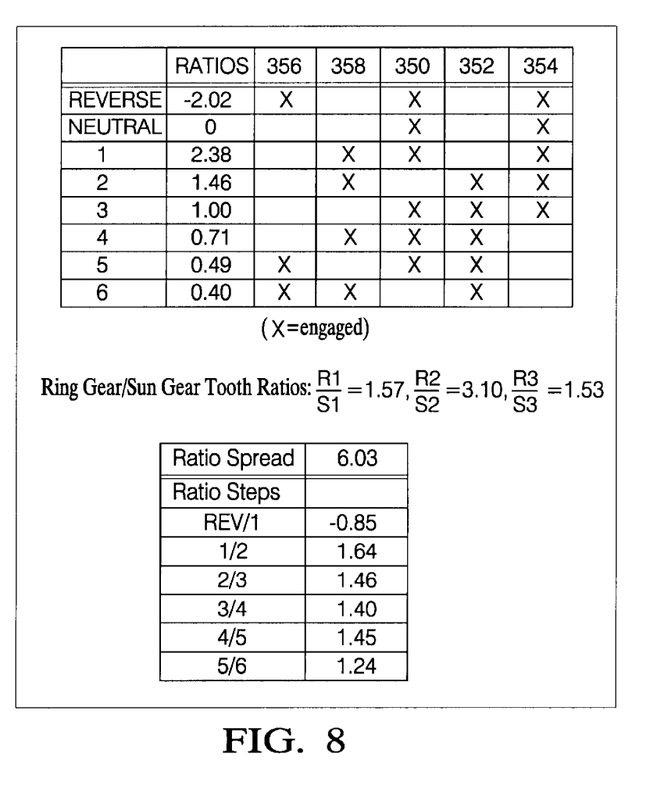
FIG. 8 is a truth table and chart depicting some of the operating characteristics of the family member shown in FIG. 7.

The truth table of FIG. 8 describes the engagement combinations and sequences for the torque-transmitting mechanisms in order to establish six forward speed ratios and one reverse speed ratio in the planetary gear arrangement 318. Also given in the truth table is a numerical example of the speed ratios that are available with the planetary gear arrangement 318 when the ring gear/sun gear tooth ratios for the planetary gearsets 320, 330, and 340 are as given in R1/S1, R2/S2, and R3/S3, respectively. Those skilled in the art will recognize from the truth table that each of the single step forward ratio interchanges are of the single transition variety, as are each of the double step forward interchanges. FIG. 8 also has a chart of the ratio steps between adjacent forward speed ratios and between the reverse and first forward speed ratio when the given speed ratio values in the truth table are utilized.

The reverse speed ratio is established with the engagement of the torque-transmitting mechanisms 350, 354, and 356. This combination of engagements connects the planet carrier assembly member 326, the planet carrier assembly member 336, and the planet carrier assembly member 346 with the transmission housing 60, and interconnects the input shaft 17 with the sun gear member 332 and ring gear member 324. During the reverse speed ratio, the ring gear members 334 and 344 are rotated at a speed determined by the speed of the sun gear member 332 and the ring gear/sun gear tooth ratio of the planetary gearset 330. The sun gear member 342 and therefore output shaft 19 are rotated at a speed determined by the speed of the ring gear member 344 and the ring gear/sun gear tooth ratio of the planetary gearset 340. The numerical value of the reverse speed ratio is determined by the ring gear/sun gear tooth ratios of the planetary gearsets 330 and 340.

The first forward speed ratio is established with the engagement of the torque-transmitting mechanisms 350, 354, and 358. This combination of engagements interconnects the sun gear member 322 with the transmission housing 60, interconnects the input shaft 17 with sun gear member 332 and ring gear member 324, and interconnects the interconnecting member 372 with the planet carrier assembly member 346. During the first forward speed ratio, the planet carrier assembly members 326, 336, and 346 are rotated at a speed determined by the speed of the ring gear member 324 and the ring gear/sun gear tooth ratio of the planetary gearset 320. The ring gear members 334 and 344 are rotated at a speed determined by the speed of the sun gear member 332, the speed of the planet carrier assembly member 336, and the ring gear/sun gear tooth ratio of the planetary gearset 330. The sun gear member 342 and therefore output shaft 19 are rotated at a speed determined by the speed of the planet carrier assembly member 346, the speed of the ring gear member 344, and the ring gear/sun gear tooth ratio of the planetary gearset 340. The numerical value of the first forward speed ratio is determined by the ring gear/sun gear tooth ratios of all three planetary gearsets 320, 330, and 340.

The second forward speed ratio is established with the engagement of the torque-transmitting mechanisms 352, 354, and 358. This combination of engagements interconnects the sun gear member 322 with the transmission housing 60, and interconnects the input shaft 17 with the planet carrier assembly members 346, 336, and 326. During the second forward speed ratio, the ring gear member 324 and sun gear member 332 are rotated at a speed determined by the speed of the planet carrier assembly member 326 and the ring gear/sun gear tooth ratio of the planetary gearset 320. The ring gear members 334 and 344 are rotated at a speed determined by the speed of the sun gear member 332, the speed of the planet carrier assembly member 336, and the ring gear/sun gear tooth ratio of the planetary gearset 330. The sun gear member 342 and therefore output shaft 19 are rotated at a speed determined by the speed of the planet carrier assembly member 346, the speed of the ring gear member 344, and the ring gear/sun gear tooth ratio of the planetary gearset 340. The numerical value of the second forward speed ratio is determined by the ring gear/sun gear tooth ratios of all three planetary gearsets 320, 330, and 340.

The third forward speed ratio is established with the engagement of the torque-transmitting mechanisms 350, 352, and 354. This combination of engagements causes the input shaft 17, the planetary gearsets 320, 330, and 340, and the output shaft 19 to rotate in unison in a direct drive. The third forward speed ratio has a numerical value of one.

The fourth forward speed ratio is established with the engagement of the torque-transmitting mechanisms 350, 352, and 358. This combination of engagements interconnects the sun gear member 322 with the transmission housing 60, and interconnects the input shaft 17 with the planet carrier assembly member 346, the sun gear member 332, and the ring gear member 324. During the fourth forward speed ratio, the planet carrier assembly members 326 and 336 are rotated at a speed determined by the speed of the ring gear member 324 and the ring gear/sun gear tooth ratio of the planetary gearset 320. The ring gear members 334 and 344 are rotated at a speed determined by the speed of the sun gear member 332, the speed of the planet carrier assembly member 336, and the ring gear/sun gear tooth ratio of the planetary gearset 330. The sun gear member 342 and therefore output shaft 19 are rotated at a speed determined by the speed of the planet carrier assembly member 346, the speed of the ring gear member 344, and the ring gear/sun gear tooth ratio of the planetary gearset 340. The numerical value of the fourth forward speed ratio is determined by the ring gear/sun gear tooth ratios of all three planetary gearsets 320, 330, and 340.

The fifth forward speed ratio is established with the engagement, of the torque-transmitting mechanisms 350, 352, and 356. This combination of engagements connects the planet carrier assembly members 326 and 336 with the transmission housing 60, and interconnects the input shaft 17 with the sun gear member 332, the ring gear member 324, and the planet carrier assembly member 346. During the fifth forward speed ratio, the ring gear members 334 and 344 are rotated at a speed determined by the speed of the sun gear member 332 and the ring gear/sun gear tooth ratio of the planetary gearset 330. The sun gear member 342 and therefore output shaft 19 are rotated at a speed determined by the speed of the planet carrier assembly member 346, the speed of the ring gear member 344, and the ring gear/sun gear tooth ratio of the planetary gearset 340. The numerical value of the fifth forward speed ratio is determined by the ring gear/sun gear tooth ratios of the planetary gearsets 330 and 340.

The sixth forward speed ratio is established with the engagement of the torque-transmitting mechanisms 352, 356, and 358. This combination of engagements effectively connects the ring gear member 344 with the transmission housing 60, and connects the input shaft 17 with planet carrier assembly member 346. During the sixth forward speed ratio, the sun gear member 342 and therefore output shaft 19 are driven at a speed determined by the speed of the planet carrier assembly member 346 and the ring gear/sun gear tooth ratio of the planetary gearset 340. The numerical value of the sixth forward speed ratio is determined by the ring gear/sun gear tooth ratio of the planetary gearset 340.

What is claimed is:

1. A multi-speed planetary transmission comprising:
   an input shaft;
   an output shaft;
   a transmission housing;
   a first planetary gear set having a first member, a second member, and a third member;
   a second planetary gear set having a first member, a second member, and a third member;
   a third planetary gear set having a first member, a second member, and a third member;
   a first interconnecting member continuously interconnecting said first member of said first planetary gearset with said first member of said second planetary gearset;
   a second interconnecting member continuously interconnecting said second member of said first planetary gearset with said second member of said second planetary gearset;
   a third interconnecting member continuously interconnecting said first member of said third planetary gearset with a member of a group consisting of said first member of said second planetary gearset and said third member of said second planetary gearset;
   said output shaft being continuously interconnected with said second member of said third planetary gearset;
   a first clutch means for selectively interconnecting said input shaft with one of said first and second interconnecting members;
   a second clutch means for selectively interconnecting said input shaft with said third member of said third planetary gearset;
   a third clutch means for selectively interconnecting said third member of said third planetary gearset with a member of a group consisting of said first interconnecting member, said second interconnecting member and said third member of said second planetary gearset;
   a first brake means for selectively interconnecting said transmission housing with a member of a group consisting of said first interconnecting member, said second interconnecting member, and said third member of said first planetary gearset;
   a second brake means for selectively interconnecting said transmission housing with a member of a group consisting of said third member of said first planetary gearset and said third member of said second planetary gearset; and
   said three clutch means and said two brake means being selectively engaged in combinations of three to establish at least six forward speed ratios and one reverse ratio between said input shaft and said output shaft.

2. A multi-speed planetary transmission comprising:
   an input shaft;
   an output shaft;
   a transmission housing;
   a first planetary gear set having a first member, a second member, and a third member;
   a second planetary gear set having a first member, a second member, and a third member;
   a third planetary gear set having a first member, a second member, and a third member;
   a first interconnecting member continuously interconnecting said first member of said first planetary gearset with said first member of said second planetary gearset;
   a second interconnecting member continuously interconnecting said second member of said first planetary gearset with said second member of said second planetary gearset;
   a third interconnecting member continuously interconnecting said first member of said third planetary gearset with a member of a group consisting of said first member of said second planetary gearset and said third member of said second planetary gearset;
   said output shaft being continuously interconnected with said second member of said third planetary gearset; and
   three clutch means and two brake means being selectively engaged in combinations of three to establish at least six forward speed ratios and one reverse ratio between said input shaft and said output shaft wherein:
   a first of said clutch means selectively interconnecting said input shaft with said second interconnecting member, a second of said clutch means selectively interconnecting said input shaft with said third member of said third planetary gear set, a third of said clutch means selectively interconnecting said third member of said third planetary gear set with said first interconnecting member, a first of said brake means selectively interconnecting said first interconnecting member with said housing, and a second of said brake means selectively interconnecting said third member of said first planetary gear set with said housing, or
   said first of said clutch means selectively interconnecting said input shaft with said second interconnecting member, said second of said clutch means selectively interconnecting said input shaft with said third member of said third planetary gear set, said third of said clutch means selectively interconnecting said third member of said third planetary gear set with said third member of said second planetary gearset, said first of said brake means selectively interconnecting said third member of said first planetary gear set with said housing, and said second of said brake means selectively interconnecting said third member of said second planetary gearset with said housing, or
   said first of said clutch means selectively interconnecting said input shaft with said first interconnecting member, said second of said clutch means selectively interconnecting said input shaft with said third member of said third planetary gear set, said third of said clutch means selectively interconnecting said third member of said third planetary gear set with said second interconnecting member, said first of said brake means selectively interconnecting said second interconnecting member with said housing, and said second of said brake means selectively interconnecting said third member of said first planetary gear set with said housing.

* * * * *